(12) United States Patent
Huang et al.

(10) Patent No.: US 8,450,948 B2
(45) Date of Patent: May 28, 2013

(54) THERMAL FOLDBACK CONTROL FOR A LIGHT-EMITTING DIODE

(75) Inventors: Pei-Cheng Huang, Taipei (TW); Jing-Meng Liu, Hsinchu County (TW)

(73) Assignee: Richtek Technology Corp., Hsinchu (TW)

( * ) Notice: Subject to any disclaimer, the term of this patent is extended or adjusted under 35 U.S.C. 154(b) by 405 days.

(21) Appl. No.: 12/977,775

(22) Filed: Dec. 23, 2010

(65) Prior Publication Data

US 2011/0163696 A1    Jul. 7, 2011

(30) Foreign Application Priority Data

Jan. 5, 2010   (TW) ................................ 99100122 A

(51) Int. Cl.
*G05F 1/00* (2006.01)

(52) U.S. Cl.
USPC ............. 315/309; 315/49; 315/291; 315/307

(58) Field of Classification Search
USPC .......... 315/49–59, 246, 209 R, 291, 307–311
See application file for complete search history.

(56) References Cited

U.S. PATENT DOCUMENTS

2009/0195215 A1 *   8/2009   Sato et al. ..................... 320/150

* cited by examiner

*Primary Examiner* — Tuyet Thi Vo
(74) *Attorney, Agent, or Firm* — Rosenberg, Klein & Lee

(57) ABSTRACT

By monitoring the temperature of an LED and the temperature of a controller chip for the LED, a thermal foldback control is employed to gradually decrease the driving current of the LED before the LED or the controller chip is over heated, so as to prevent an over temperature protection from being triggered to shutdown the controller chip to cause the LED to undesirably flicker.

22 Claims, 3 Drawing Sheets

THERMAL FOLDBACK CONTROL FOR A LIGHT-EMITTING DIODE

FIELD OF THE INVENTION

The present invention is related generally to a light-emitting diode (LED) driver and, more particularly, to a thermal foldback control circuit and method for an LED.

BACKGROUND OF THE INVENTION

The controller chip for LED drivers is typically equipped with over temperature protection (OTP) which will shutdown the controller chip once the temperature of the controller chip increases over a setting value, to prevent the controller chip from being burnt out. The thermal foldback control is a protection mechanism for an LED, which will decrease the driving current of the LED when the temperature of the controller chip increases over a setting value, to avoid the temperature of the controller chip still increasing. The existing design of LED lamps concentrates on the security and heat dissipation of the LEDs, and thus puts the LEDs in a space with good air convection to reduce the surface temperature of the LEDs, while puts the driver circuit in another closed space. Therefore, the controller chip in the driver circuit is hard to dissipate its heat and sometimes becomes hotter than the LEDs, which will trigger the OTP mechanism to push the controller chip into a thermal protection mode, thereby turning off the driving current of the LEDs and causing the LEDs to undesirably flicker.

SUMMARY OF THE INVENTION

An object of the present invention is to provide a thermal foldback control circuit and method that will gradually adjust the driving current of an LED depending on temperature variation.

Another object of the present invention is to provide a simple circuit and method that simultaneously monitor the temperature variations of an LED and its controller chip to adjust the driving current of the LED, thereby automatically regulating the temperatures of the LED and the controller chip.

According to the present invention, a thermal foldback control circuit and method for an LED monitors the temperature of the LED and the temperature of the controller chip of the LED simultaneously, and find out the higher one thereof to determine the level for thermal balance.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
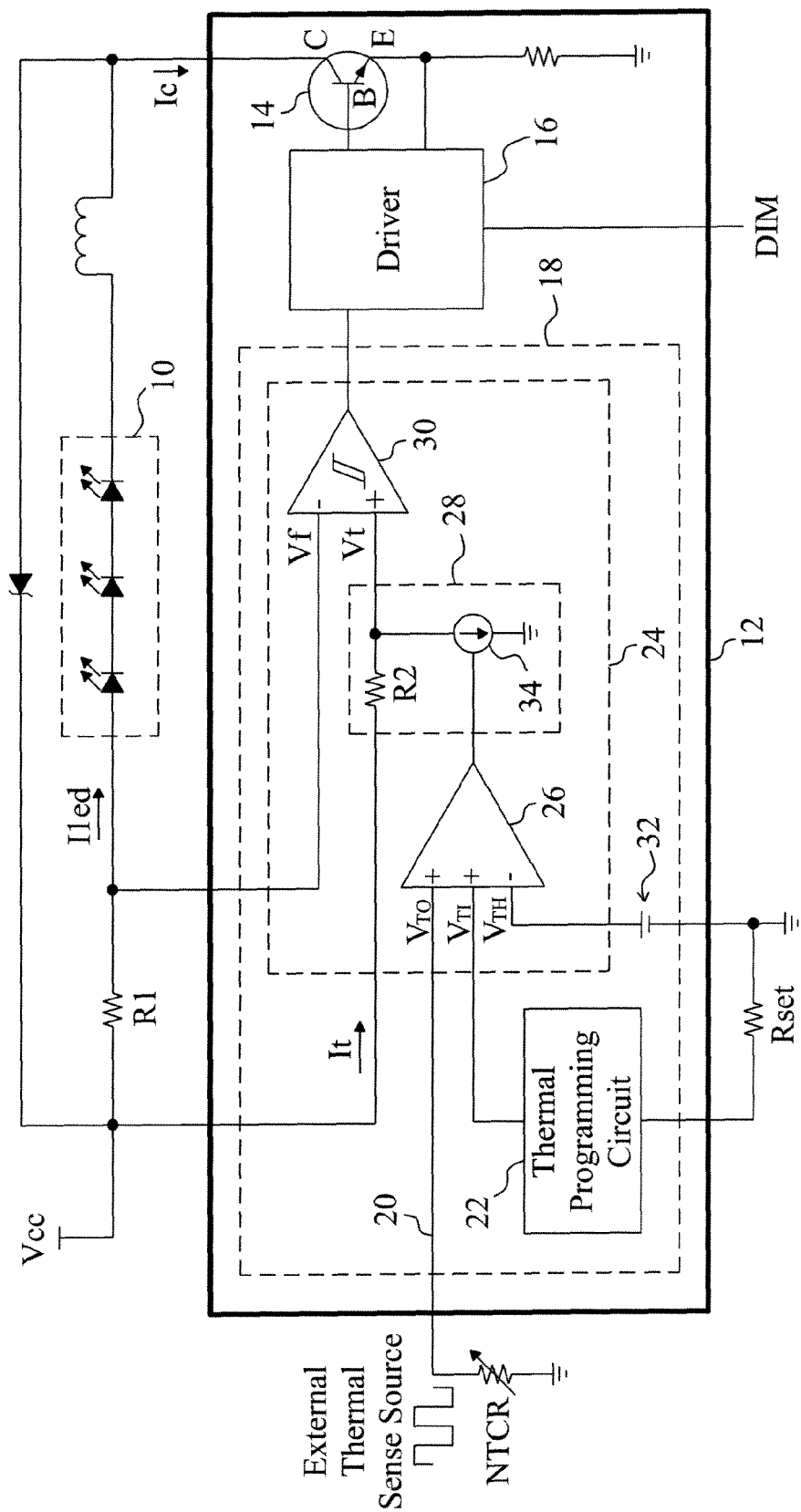
FIG. 1 is a circuit diagram of an embodiment according to the present invention.

FIG. 1 is a circuit diagram of an embodiment according to the present invention, in which an LED array 10 is coupled with a power source Vcc through a resistor R1, and a controller chip 12 is coupled to the LED array 10 to control the driving current lied thereof. The controller chip 12 includes a bipolar junction transistor (BJT) 14 serially coupled to the LED array 10 to provide the collector current Ic as the driving current lied, and a driver 16 coupled to the base of the BJT 14 to control the collector current Ic. Similar to prior arts, the controller chip 12 has a dimming pin DIM coupled to the driver 16 to receive a dimming input for controlling the illumination of the LED array 10. The controller chip 12 further includes a thermal foldback control circuit 18 that provides a thermal regulation signal for the driver 16 to adjust the collector current Ic. A negative temperature coefficient resistor NTCR detects the temperature of the LED array 10 to generate an external thermal detection signal $V_{TO}$ for the controller chip 12. When the detected temperature increases, the resistance of the negative temperature coefficient resistor NTCR decreases, thereby decreasing the external thermal detection signal $V_{TO}$. The thermal foldback control circuit 18 has an external thermal detection input 20 for receiving the external thermal detection signal $V_{TO}$, a thermal programming circuit 22 for detecting the temperature of the controller chip 12 itself to generate an internal thermal detection signal $V_{TI}$, and a multi-sense circuit 24 triggers the thermal regulation signal according to the external thermal detection signal $V_{TO}$ and the internal thermal detection signal $V_{TI}$. In the multi-sense circuit 24, a multi-input comparator 26 has two positive inputs for receiving the external thermal detection signal $V_{TO}$ and the internal thermal detection signal $V_{TI}$, respectively, to be compared with a threshold signal $V_{TH}$ received from a negative input to generate a comparison signal for a voltage generator 28 to generate an overheat detection voltage Vt, and a hysteresis comparator 30 compares the overheat detection voltage Vt with a feedback voltage Vf fed back from the LED array 10 to trigger the thermal regulation signal. Due to the driving current lied flowing through the resistor R1, the feedback voltage $$Vf = Vcc - Iled \times R1, \quad [Eq\text{-}1]$$

which is a function of the driving current lied. The threshold signal $V_{TH}$ of the multi-input comparator 26 is provided by a temperature independent voltage source 32. The voltage generator 28 includes a voltage-controlled current source 34 to determine an overheat detection current It according to the output of the multi-input comparator 26, and a resistor R2 coupled between the power source Vcc and the positive input of the hysteresis comparator 30 such that the overheat detection current It flows through the resistor R2 to generate a voltage drop to produce the overheat detection voltage $$Vt = Vcc - It \times R2, \quad [Eq\text{-}2]$$

which is a function of the overheat detection current It. In one embodiment, the overheat detection current It has an initial value of zero. When the temperature of the external LED array 10 is over threshold or the internal temperature of the controller chip 12 is over threshold, the comparison signal generated by the multi-input comparator 26 will make the current source 34 to increase the overheat detection current It and thereby decrease the overheat detection voltage Vt. As a result, the hysteresis comparator 30 will trigger the thermal regulation signal to make the driver 16 to reduce the collector current Ic, while the LED array 10 will remain operation. Each time the thermal regulation signal is triggered, the driver 16 will reduce the collector current Ic by a predetermined difference. Unless the controller chip 12 reaches the upper limit for OTP, the system won't trigger the OTIC mechanism to shutdown the controller chip 12. Therefore, either the LED array 10 or the controller chip 12 has an over temperature, the collector current Ic will decrease without stopping the LED array 10 working. In virtue of the multi-input comparator 26, it can find. out which. one of the temperature of the external. LED array 10 and the internal temperature of the controller chip 12 is higher, and then determine the level for temperature balance. Such a detection scheme is more flexible and allows users with more setting capacity to control the temperature protection of the LED lamps.

Figure 3:
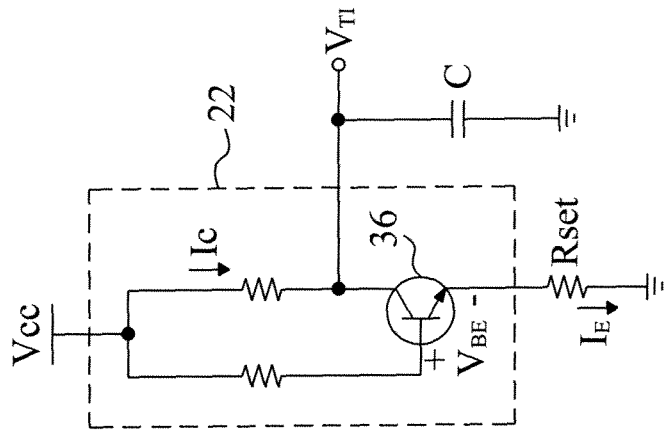
FIG. 3 is a circuit diagram of a second embodiment for the thermal programming circuit shown in FIG. 1.
Figure 2:
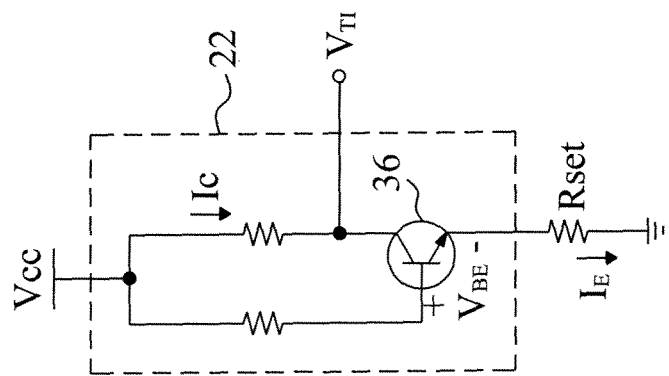
FIG. 2 is a circuit diagram of a first embodiment for the thermal programming circuit shown in FIG. 1.

FIG. 2 is a circuit diagram of a first embodiment for the thermal programmingcircuit 22 which employs a simple BJT circuit to generate the internal thermal detection signal $V_{TI}$. A BJT 36 has a base-emitter voltage $V_{BE}$ of about 0.7V at room temperature, and as the temperature increases, $V_{BE}$ goes down and thus increases the collector current Ic, thereby decreasing the internal thermal detection signal $V_{TI}$. The internal thermal detection signal $V_{TI}$ can have its initial value set by adjusting a setting resistor Rset. The higher the resistance of the setting resistor Rset is, the lower the initial value of the internal thermal detection signal $V_{TI}$ is, which in turn means the lower the threshold temperature of the controller chip 12 itself is. As shown in FIG. 3, by additionally providing a capacitor C at the output of the thermal programming circuit 22, the stability of the internal thermal detection signal $V_{TI}$ can be improved. For downsizing the controller chip 12, in the embodiment of FIG. 3, the setting resistor Rset of the thermal programming circuit 10 is arranged outside the controller chip 12. However, in other embodiments, the setting resistor Rset may be integrated into the controller chip 12.

The thermal foldback control circuit 18 of the present invention is advantageous because it can automatically find out the higher one of the temperature of the external LED array 10 and the internal temperature of the controller chip 12 for the adjustment of the driving current Iled in a manner that the driving current Iled is gradually decreased along the elevated temperature of either the controller chip 12 or the LED array 10, so as to mitigate the increasing temperature and thus regulate the temperatures of the controller chip 12 and the LED array 10, thereby reducing the risk of stopping the LED array 10 working caused by the overheated controller chip 12.

Figure 4:
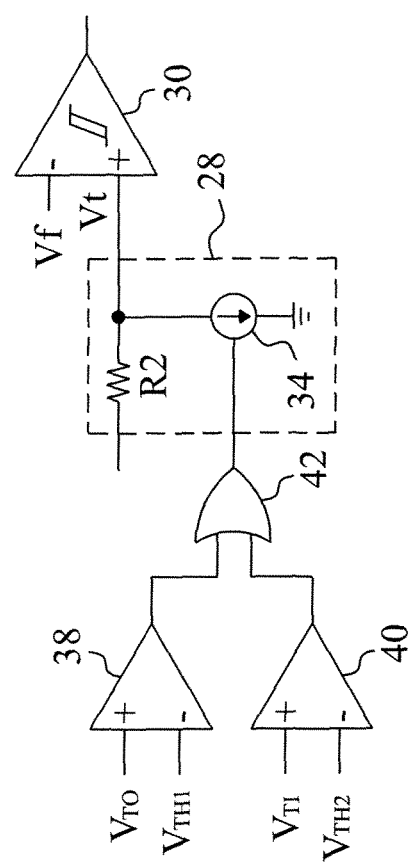
FIG. 4 is a circuit diagram of an embodiment using multiple threshold signals.

In the embodiment of FIG. 1, only a threshold signal VTH serves for temperature monitoring in the controller chip 12 and of the external LED array 10. However, in another embodiment, as shown in FIG. 4, the LED array 10 and the controller chip 12 may be monitored by two separate threshold signals VTH1 and VTH2, which are compared by using two comparators 38 and 40. In this case, an OR gate 42 generates the comparison signal for controlling the voltage generator 28 according to the comparison results of the comparators 38 and 40.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A thermal foldback control circuit for an LED driven by a driving current provided by a controller chip, the thermal foldback control circuit comprising:
   an external thermal detection input receiving an external thermal detection signal related to a temperature of the LED;
   a thermal programming circuit operative to detect a temperature of the controller chip and determine an internal thermal detection signal accordingly; and
   a multi-sense circuit coupled to the external thermal detection input and the thermal programming circuit, operative to trigger a thermal regulation signal when the external thermal detection signal increases over a first threshold signal or the internal thermal detection signal increases over a second threshold signal, for adjusting the driving current and thereby automatically regulating the temperatures of the LED and the controller chip.

2. The thermal foldback control circuit of claim 1, wherein the external thermal detection input is coupled to a negative temperature coefficient resistor.

3. The thermal foldback control circuit of claim 1, wherein the thermal programming circuit comprises a bipolar junction transistor having a base-emitter voltage adjusting the internal thermal detection signal in response to a temperature variation.

4. The thermal foldback control circuit of claim 1, wherein the thermal programming circuit is coupled to a setting resistor for setting an initial value of the internal thermal detection signal.

5. The thermal foldback control circuit of claim 1, further comprising a voltage source coupled to the multi-sense circuit, providing the first and second threshold signals thereto.

6. The thermal fold back control circuit of claim 1, wherein the thermal regulation signal is used to turn of the driving current when the LED is overheated, thereby automatically turning off the LED for reducing the temperature of the LED.

7. The thermal foldback control circuit of claim 1, wherein the first threshold signal and the second threshold signal are substantially equal to each other.

8. The thermal foldback control circuit of claim 7, wherein the multi-sense circuit comprises:
   a multi-input comparator coupled to the external thermal detection input and the thermal programming circuit, comparing the external thermal detection signal with the first threshold signal and comparing the internal thermal detection signal with the second threshold signal, to generate a comparison signal;
   a voltage generator coupled to the comparator, responsive to the comparison signal to generate an overheat detection voltage; and
   a hysteresis comparator coupled to the voltage generator and the LED, comparing the overheat detection voltage with a feedback voltage fed back from the LED to trigger the thermal regulation signal.

9. The thermal foldback control circuit of claim 8, wherein the voltage generator comprises:
   a voltage-controlled current source coupled to the multi-input comparator, responsive to the comparison signal to generate an overheat detection current; and
   a resistor coupled to the voltage-controlled current source;
   wherein the overheat detection current flows through the resistor to generate the overheat detection voltage.

10. The thermal foldback control circuit of claim 8, wherein the feedback voltage is a function of the driving current.

11. The thermal foldback control circuit of claim 1, wherein the first threshold signal and the second threshold signal are substantially not equal to each other.

12. The thermal foldback control circuit of claim 11, wherein the multi-sense circuit comprises:

a first comparator coupled to the external thermal detection input, comparing the external thermal detection signal with the first threshold signal to generate a first comparison signal;

a second comparator coupled to the thermal programming circuit, comparing the internal thermal detection signal with the second threshold signal to generate a second comparison signal;

an OR gate coupled to the first and second comparators, operative to generate a third comparison signal according to the first and second comparison signals;

a voltage generator coupled to the OR gate, responsive to the third comparison signal to generate an overheat detection voltage; and a hysteresis comparator coupled to the voltage generator and the LED, comparing the overheat detection voltage with a feedback voltage fed back from the LED to trigger the thermal regulation signal.

13. The thermal foldback control circuit of claim 12, wherein the voltage generator comprises:

a voltage-controlled current source coupled to the OR gate, responsive to the third comparison signal to generate an overheat detection current; and a resistor coupled to the voltage-controlled current source; wherein the overheat detection current flows through the resistor to generate the overheat detection voltage.

14. The thermal foldback control circuit of claim 12, wherein the feedback voltage is a function of the driving current.

15. A thermal foldback control method for an LED driven by a driving current provided by a controller chip, the thermal foldback control method comprising the steps of:

A.) receiving an external thermal detection signal related to a temperature of the LED;

B.) detecting a temperature of the controller chip to determine an internal thermal detection signal; and C.) triggering a thermal regulation signal when the external thermal detection signal increases over a first threshold signal or the internal thermal detection signal increases over a second threshold signal, to adjust the driving current and thereby automatically regulate the temperatures of the LED and the controller chip.

16. The thermal foldback control method of claim 15, wherein the step B comprises the step of adjusting the internal thermal detection signal in response to a variation of a base-emitter voltage of a bipolar junction transistor.

17. The thermal foldback control method of claim 15, further comprising the step of setting an initial value of the internal thermal detection signal.

18. The thermal foldback control method of claim 15, wherein the first threshold signal and the second threshold signal are substantially equal to each other.

19. The thermal foldback control method of claim 15, wherein the first threshold signal and the second threshold signal are substantially not equal to each other.

20. The thermal foldback control method of claim 15, wherein the step C comprises the step of turning off the driving current when the LED is overheated, for automatically turning off the LED for reducing the temperature of the LED.

21. The thermal foldback control method of claim 15, wherein the step C comprises the steps of:

comparing the external thermal detection signal with the first threshold signal and comparing the internal thermal detection signal to the second threshold signal, to generate an overheat detection voltage; and comparing the overheat detection voltage with a feedback voltage fed back from the LED, to trigger the thermal regulation signal.

22. The thermal foldback control method of claim 21, wherein the feedback voltage is a function of the driving current.

* * * * *